United States Patent
Kirillov (10) Patent No.: US 12,072,449 B2
(45) Date of Patent: Aug. 27, 2024

(54) DISPERSION COMPENSATION FOR A FREQUENCY-MODULATED CONTINUOUS-WAVE (FMCW) LIDAR SYSTEM

(71) Applicant: Infineon Technologies AG, Neubiberg (DE)

(72) Inventor: Boris Kirillov, Judendorf-Straßenge (AT)

(73) Assignee: Infineon Technologies AG, Neubiberg (DE)

( * ) Notice: Subject to any disclaimer, the term of this patent is extended or adjusted under 35 U.S.C. 154(b) by 116 days.

(21) Appl. No.: 17/850,017

(22) Filed: Jun. 27, 2022

(65) Prior Publication Data

US 2022/0334236 A1 Oct. 20, 2022

Related U.S. Application Data

(63) Continuation of application No. 16/839,237, filed on Apr. 3, 2020, now Pat. No. 11,397,252.

(51) Int. Cl.
*G01C 3/08* (2006.01)
*G01S 7/4911* (2020.01)
*G01S 17/34* (2020.01)

(52) U.S. Cl.
CPC ............. *G01S 7/4911* (2013.01); *G01S 17/34* (2020.01)

(58) Field of Classification Search
CPC .................................. G01S 7/4911; G01S 17/34
See application file for complete search history.

(56) References Cited

U.S. PATENT DOCUMENTS 6,573,982 B1 6/2003 Pruitt
8,542,435 B2 9/2013 Raybaut et al.
(Continued)

FOREIGN PATENT DOCUMENTS

CN 102854696 A 1/2013
CN 110687520 A 1/2020
(Continued)

OTHER PUBLICATIONS

Chengxin, L., et al., "Microwave photonics Frequency conversion and phase Shifting techniques for Photoelectric," Chinese Lasers, vol. 46, No. 01, 2019.

*Primary Examiner* — Mark Hellner
(74) *Attorney, Agent, or Firm* — Harrity & Harrity, LLP (57) ABSTRACT

An oscillator system includes a transmitter configured to transmit a frequency modulated continuous wave (FMCW) light beam along a transmission path, where the FMCW light beam comprises a plurality of wavelength ramps and a wavelength of the FMCW light beam continuously varies over time; and an oscillator structure configured to oscillate about a scanning axis based on a deflection angle of the oscillator structure that continuously varies over time. The oscillator structure is arranged in the transmission path and is configured to receive the FMCW light beam at a reflective surface. The reflective surface is a micro-structured surface configured to compensate for a propagation direction disturbance caused by an oscillation of the oscillator structure such that each wavelength of a corresponding wavelength ramp of the FMCW light beam is reflected by the reflective surface in a same direction along transmission path.

21 Claims, 4 Drawing Sheets

(56) References Cited

U.S. PATENT DOCUMENTS

| | | | |
|---|---|---|---|
| 11,150,331 B2 | 10/2021 | Norbert et al. | |
| 11,397,252 B2 | 7/2022 | Kirillov | |
| 2004/0101237 A1 | 5/2004 | Cao | |
| 2013/0214963 A1 | 8/2013 | Vacanti | |
| 2018/0136323 A1 | 5/2018 | Pozdniakov et al. | |
| 2018/0238675 A1* | 8/2018 | Wan | G01B 9/0203 |
| 2021/0063514 A1 | 3/2021 | Liu et al. | |
| 2021/0063541 A1* | 3/2021 | Zheng | G01S 7/4817 |
| 2022/0113417 A1 | 4/2022 | Wang et al. | |

FOREIGN PATENT DOCUMENTS

| | | |
|---|---|---|
| CN | 111913165 A | 11/2020 |
| CN | 112147636 A | 12/2020 |
| WO | 2020064224 A1 | 4/2020 |

\* cited by examiner

DISPERSION COMPENSATION FOR A FREQUENCY-MODULATED CONTINUOUS-WAVE (FMCW) LIDAR SYSTEM

CROSS-REFERENCE TO RELATED APPLICATIONS

This application is a continuation of U.S. patent application Ser. No. 16/839,237 filed Apr. 3, 2020, which is incorporated by reference as if fully set forth.

FIELD

The present disclosure relates generally to a frequency-modulated continuous-wave (FMCW) Light Detection and Ranging (LIDAR) system.

BACKGROUND

Light Detection and Ranging (LIDAR), is a remote sensing method that uses light, such as transmitted laser beams, to measure ranges (variable distances) to one or more objects in a field of view. In particular, a microelectromechanical system (MEMS) mirror is used to scan light across the field of view. Arrays of photodetectors receive reflections from objects illuminated by the light, and a time-of-flight (ToF) it takes for the reflections to arrive at various sensors in the photodetector array is determined. LIDAR systems form depth measurements and make distance measurements by mapping the distance to objects based on the time-of-flight computations. Thus, the time-of-flight computations can create distance and depth maps, which may be used to generate images.

Indirect ToF three-dimensional image (3DI) sensors are based on continuously modulated light for scene illumination, and demodulation of the received light on a pixel level during integration phases. In particular, continuous wave modulation uses continuous light beams instead of short light pulses and the modulation is done in terms of frequency of sinusoidal waves.

A scan such as an oscillating horizontal scan (e.g., from left to right and right to left of a field of view) can illuminate a scene in a continuous scan fashion. Since the light is transmitted continuously, the light transmitted by one or more light sources results in a scan line that continuously moves across the field of view as the (MEMS) mirror rotates about an axis. Thus, an area referred to as the field of view can be scanned and objects within the area can be detected and imaged.

For continuous wave modulation, such as that used for a frequency-modulated continuous-wave (FMCW) beam, a detected wave after reflection has a shifted frequency and/or phase, and the shift is proportional to distance from reflecting object or surface. Thus, the distance can be determined from the measured shift. This is in contrast to pulsed modulation, in which a system measures distance to a 3D object by measuring the absolute time a light pulse takes to travel from a source into the 3D scene and back, after reflection.

However, an issue arises when implementing continuous scanning of a FMCW beam due to the changing wavelength (frequency) of the beam in combination with the continuous scanning motion of the MEMS mirror. Due to the mirror motion and the wavelength sweep of the FMCW beam, the propagation direction of the light beam is wavelength (frequency) dependent. As a result, all wavelengths of the FMCW beam cannot be directed at the same point on a target which disrupts the FMCW measurement principle.

Therefore, an improved FMCW LIDAR system that can compensate for this dispersion effect may be desirable.

SUMMARY

One or more embodiments provide an oscillator system that includes a transmitter configured to transmit a frequency modulated continuous wave (FMCW) light beam along a transmission path, where the FMCW light beam includes a plurality of wavelength ramps and a wavelength of the FMCW light beam continuously varies over time; an oscillator structure configured to oscillate about a scanning axis based on a deflection angle of the oscillator structure that continuously varies over time; and a dispersive element arranged in the transmission path and configured to receive the FMCW light beam and output a compensated FMCW light beam along the transmission path, wherein the dispersive element is configured to compensate for a propagation direction disturbance caused by an oscillation of the oscillator structure. The oscillator structure is arranged in the transmission path and is configured to direct the FMCW light beam or the compensated FMCW light beam towards an output of the transmission path.

One or more embodiments provide an oscillator system that includes a transmitter configured to transmit a frequency modulated continuous wave (FMCW) light beam along a transmission path, where the FMCW light beam includes a plurality of wavelength ramps and a wavelength of the FMCW light beam continuously varies over time; and an oscillator structure configured to oscillate about a scanning axis based on a deflection angle of the oscillator structure that continuously varies over time. The oscillator structure is arranged in the transmission path and is configured to receive the FMCW light beam at a reflective surface. Additionally, the reflective surface is a micro-structured surface configured to compensate for a propagation direction disturbance caused by an oscillation of the oscillator structure such that each wavelength of a corresponding wavelength ramp of the FMCW light beam is reflected by the reflective surface in a same direction along transmission path.

One or more embodiments provide a method of controlling an oscillator structure. The method includes transmitting a frequency modulated continuous wave (FMCW) light beam along a transmission path, where the FMCW light beam includes a plurality of wavelength ramps and a wavelength of the FMCW light beam continuously varies over time; driving an oscillator structure about a scanning axis based on a deflection angle of the oscillator structure that continuously varies over time, where the oscillator structure is arranged in the transmission path and is configured to direct the FMCW light beam or a compensated FMCW light beam that is derived from the FMCW light beam towards an output of the transmission path; and synchronizing the wavelength of the FMCW light beam with the deflection angle of the oscillator structure.

BRIEF DESCRIPTION OF THE DRAWINGS

Embodiments are described herein making reference to the appended drawings.

DETAILED DESCRIPTION

In the following, various embodiments will be described in detail referring to the attached drawings. It should be noted that these embodiments serve illustrative purposes only and are not to be construed as limiting. For example, while embodiments may be described as comprising a plurality of features or elements, this is not to be construed as indicating that all these features or elements are needed for implementing embodiments. Instead, in other embodiments, some of the features or elements may be omitted, or may be replaced by alternative features or elements. Additionally, further features or elements in addition to the ones explicitly shown and described may be provided, for example conventional components of sensor devices.

Features from different embodiments may be combined to form further embodiments, unless specifically noted otherwise. Variations or modifications described with respect to one of the embodiments may also be applicable to other embodiments. In some instances, well-known structures and devices are shown in block diagram form rather than in detail in order to avoid obscuring the embodiments.

Connections or couplings between elements shown in the drawings or described herein may be wire-based connections or wireless connections unless noted otherwise. Furthermore, such connections or couplings may be direct connections or couplings without additional intervening elements or indirect connections or couplings with one or more additional intervening elements, as long as the general purpose of the connection or coupling, for example to transmit a certain kind of signal or to transmit a certain kind of information, is essentially maintained.

Embodiments relate to optical sensors and optical sensor systems and to obtaining information about optical sensors and optical sensor systems. A sensor may refer to a component which converts a physical quantity to be measured to an electric signal, for example a current signal or a voltage signal. The physical quantity may, for example, comprise electromagnetic radiation, such as visible light, infrared (IR) radiation, or other type of illumination signal, a current, or a voltage, but is not limited thereto. For example, an image sensor may be a silicon chip inside a camera that converts photons of light coming from a lens into voltages. The larger the active area of the sensor, the more light that can be collected to create an image.

A sensor device as used herein may refer to a device which comprises a sensor and further components, for example biasing circuitry, an analog-to-digital converter or a filter. A sensor device may be integrated on a single chip, although in other embodiments a plurality of chips or also components external to a chip may be used for implementing a sensor device.

In frequency-modulated continuous-wave (FMCW) Light Detection and Ranging (LIDAR) systems, a light source continuously transmits a FWCM light beam into a field of view and the light reflects from one or more objects by backscattering. In particular, FWCM LIDAR is an indirect Time-of-Flight (TOF) system during which the frequency or wavelength of a transmitted light beam is continuously swept between a minimum value and a maximum value that define a predefined frequency/wavelength range or band. For example, the frequency or wavelength of the transmitted light beam may be modulated according to a triangle-wave modulation pattern comprised of a series of frequency or wavelength ramps.

Figure 1:
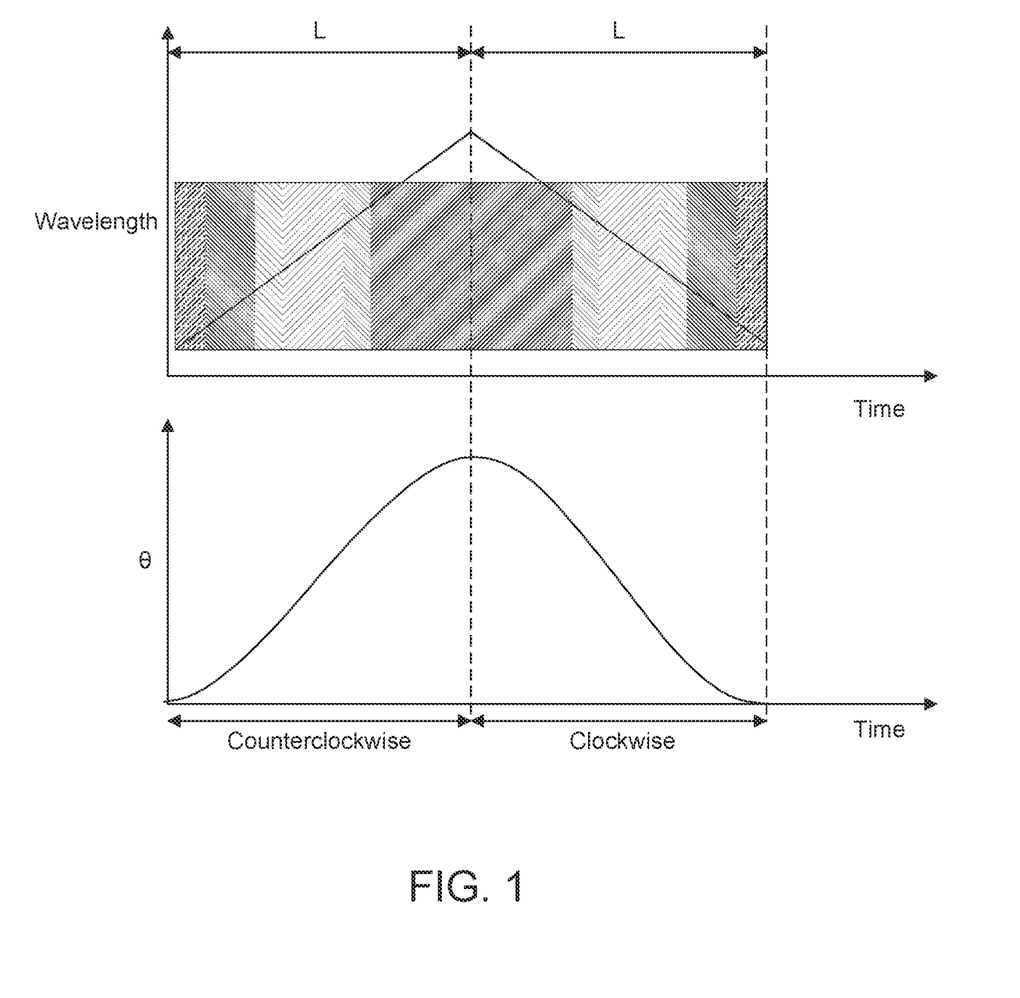
FIG. 1 illustrates a dependency of a wavelength (frequency) of a FMCW light beam based on deflection angle θ of a microelectromechanical system (MEMS) mirror according to one of more embodiments.

FIG. 1 illustrates a dependency of a wavelength (frequency) of a FMCW light beam based on deflection angle θ of a microelectromechanical system (MEMS) mirror according to one of more embodiments. A deflection angle θ may be a tilt angle, a rotation angle, a mirror position, a rotation position, or any other reference to a position of the MEMS mirror with respect to its scanning axis. Hence, these position terms may be used interchangeably herein.

FIG. 1 includes a top diagram and bottom diagram. The top diagram of FIG. 1 shows a wavelength ramp of a FMCW light beam used for FMCW ranging in one or more embodiments. The wavelength ramp includes a forward ramp (up-ramp) portion and a backward ramp (down-ramp) portion. Thus, different wavelengths are transmitted at different times.

The bottom diagram of FIG. 1 shows a deflection angle θ of a MEMS mirror over time as the MEMS mirror performs a scanning operation, with a movement of the MEMS mirror being from right-to-left (i.e., counterclockwise) during the forward ramp of the wavelength ramp and being from left-to-right (i.e., clockwise) during the backward ramp of the wavelength ramp. Both the wavelength of the FMCW light beam and the deflection angle θ of the MEMS mirror are constantly changing over time. Thus, different wavelengths of the FMCW light beam are incident on the MEMS mirror at different transmission times and at different deflection angle θ.

As a result, different wavelengths of the FMCW light beam are dispersed and directed in different directions by the MEMS mirror despite the intention to transmit all wavelengths of at a same direction. Consequently, all wavelengths of the FMCW light beam cannot be directed at the same point on a target, which disrupts the FMCW measurement principle.

A length L of the wavelength/frequency ramp is equivalent to an amount of time (i.e., a duration) it takes for the wavelength to change from a minimum wavelength to a maximum wavelength or vice versa. The length L of the forward ramp (up-ramp) portion and the backward ramp portion may be equal. Thus, one triangle wave interval is 2 L in duration. It is also to be noted that the length L, and consequently a length of a triangle wave interval, of the wavelength/frequency ramp is adjustable by a controller of the FMCW LIDAR system. For example, the controller can adjust the slope and thus the length L of the ramp according to the oscillation frequency of the MEMS mirror. In this way, the length L of the ramp can be synchronized with the MEMS mirror motion, particularly with the angular range of motion from a zero tilt angle to a maximum tilt angle. For example, each wavelength of the FMCW light beam is mapped to a specific deflection angle and the continuous change of the wavelength is synchronized with a continuous change of the deflection angle. Thus, the wavelength changes in step with the deflection angle of the MEMS mirror.

In this case a minimum wavelength of the wavelength ramp is mapped to a zero tilt angle and a maximum wavelength of the wavelength ramp is mapped to a maximum tilt angle. Alternatively, this could be reversed where a minimum wavelength of the wavelength ramp is mapped to a maximum tilt angle and a maximum wavelength of the wavelength ramp is mapped to a zero tilt angle. A sensing circuit may be further provided to sense a rotational or deflection position (e.g., the rotation angle θ of the MEMS mirror) in order to provide further feedback information to the controller in order to aid in the synchronization.

Figure 2A:
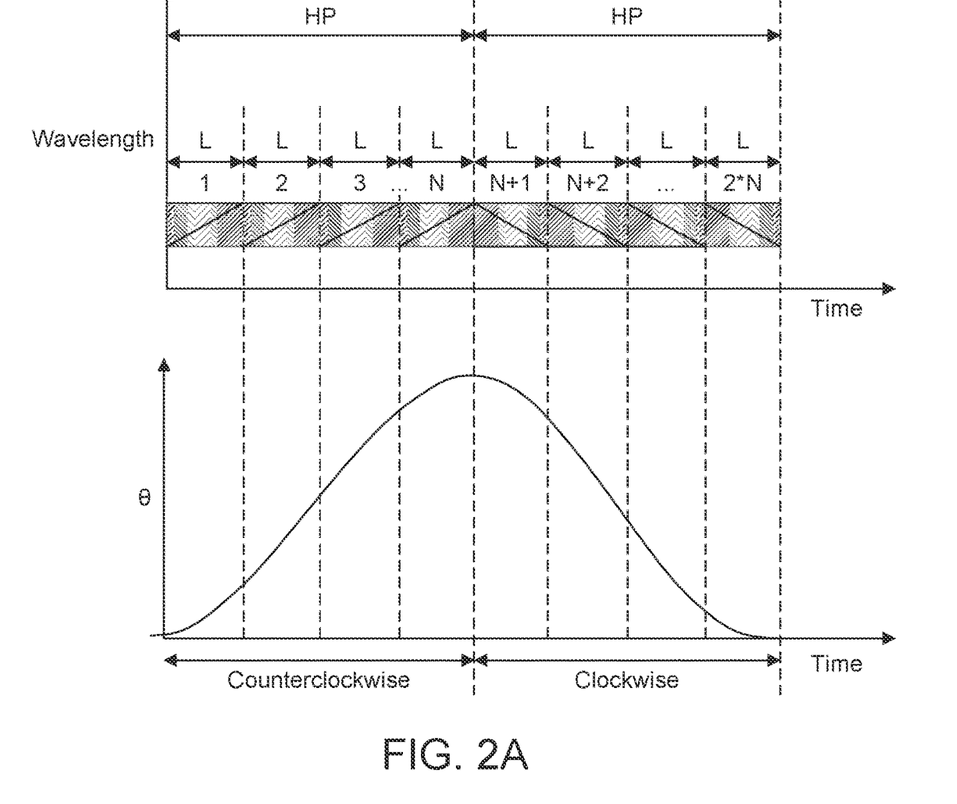
FIG. 2A illustrates a further dependency of a wavelength (frequency) of a FMCW light beam based on deflection angle θ of a microelectromechanical system (MEMS) mirror according to one of more embodiments.

FIG. 2A illustrates a further dependency of a wavelength (frequency) of a FMCW light beam based on deflection angle θ of a microelectromechanical system (MEMS) mirror according to one of more embodiments. FIG. 2A includes a top diagram and bottom diagram.

The top diagram of FIG. 2A shows a series or plurality of wavelength ramps of a FMCW light beam used for FMCW ranging in one or more embodiments. The wavelength ramps include a series of N forward ramps (up-ramps) and a series of N backward ramps (down-ramps), wherein N is an integer greater than zero and a total number of wavelength ramps over a full period of a MEMS mirror motion is 2N. Thus, different wavelengths are transmitted at different times.

The bottom diagram of FIG. 2A shows a deflection angle θ of a MEMS mirror over time as the MEMS mirror performs a scanning operation, with a movement of the MEMS mirror being from right-to-left (i.e., counterclockwise) during the forward ramp of the wavelength ramp and being from left-to-right (i.e., clockwise) during the backward ramp of the wavelength ramp. Both the wavelength of the FMCW light beam and the deflection angle θ of the MEMS mirror are constantly changing over time. Thus, different wavelengths of the FMCW light beam are incident on the MEMS mirror at different transmission times and at different deflection angle θ.

In particular, multiple ramps can fit into a half period HP of the MEMS mirror motion. In this case, a series of consecutive N forward ramps are generated during a first half period of one period of the MEMS mirror motion, and a series of consecutive N backward ramps are generated during a second half period of the same period of the MEMS mirror motion. The two series of consecutive N ramps may also be reversed such that the series of consecutive N backward ramps are generated during the first half period and the series of consecutive N forward ramps are generated during the second half period. Nevertheless, in one period, the series of consecutive N forward ramps and the series of consecutive N backward ramps are contiguous in that the last ramp in the first series and the first ramp in the second series join at a maximum deflection angle of the MEMS mirror to form a triangle.

It is at the maximum deflection angle that the MEMS mirror alters is direction of motion. Thus, in order to make dispersion compensation always functional it is necessary to alter the direction of the wavelength ramps at the moment when the MEMS mirror is altering its direction of motion (i.e., maximum deflection angle). In other words, a light beam transmitter changes the direction of the ramps from forwards to backwards or from backwards to forwards at the maximum deflection angle of the MEMS mirror. The pattern of forward and backward wavelength ramps then repeats for the next MEMS mirror motion period.

Additionally, each wavelength ramp has a length L that is equivalent to an amount of time (i.e., a duration) it takes for the wavelength to change from a minimum wavelength to a maximum wavelength or vice versa. Here, a mirror period can be defined as 2N*L.

The length L of the wavelength ramps is adjustable by a controller of the FMCW LIDAR system. For example, the controller can adjust the slope and thus the length L of the ramps according to the oscillation frequency of the MEMS mirror. In this way, the length L of the ramps can be synchronized with the MEMS mirror motion. Particularly, the controller can assign (i.e., map) and synchronize each ramp with a sub-range or segment of the full angular range of the MEMS mirror, as is shown in FIG. 2A. For example, the first wavelength ramp is synchronized to a first angular sub-range of the MEMS mirror motion, the second wavelength ramp is synchronized to a second angular sub-range of the MEMS mirror motion, and the final wavelength ramp 2N is synchronized to a last angular sub-range of the MEMS mirror motion. In each angular sub-range, the transmitter varies (i.e., ramps) the wavelength in synchronization with change in the deflection angle of the MEMS mirror. As a result, the continuous change of the wavelength is synchronized with a continuous change of the deflection angle. Thus, the wavelength changes in step with the deflection angle of the MEMS mirror.

Figure 2B:
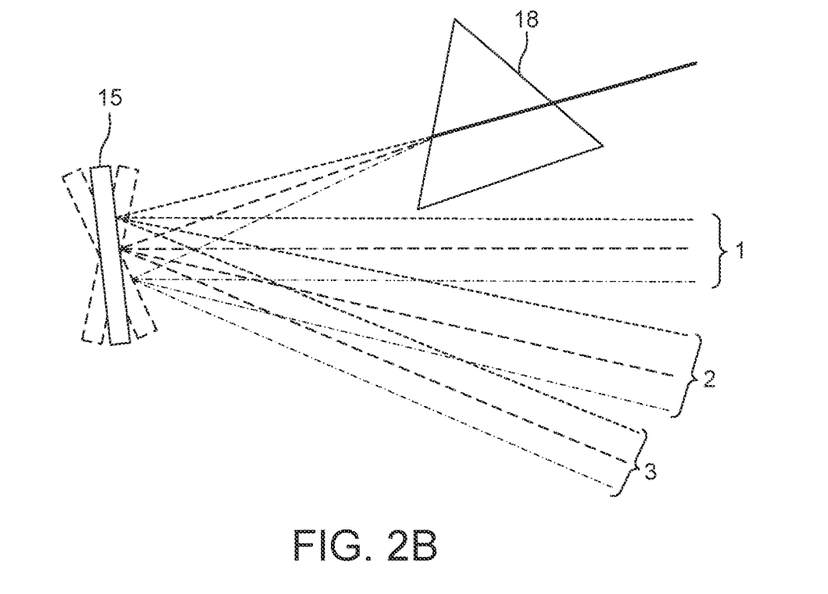
FIG. 2B illustrates a correlation of different wavelength ramps shown FIG. 2A to different dedicated transmission directions according to one of more embodiments.

Additionally, FIG. 2B illustrates a correlation of different wavelength ramps shown FIG. 2A to different dedicated transmission directions according to one of more embodiments. In particular, FIG. 2B shows a transmission direction of a subset of wavelength ramps (i.e., wavelength ramps 1, 2, and 3) of a FMCW light beam, where each directional beam 1, 2, and 3 corresponds to a different wavelength ramp 1, 2, and 3 of the FMCW light beam shown in the top diagram of FIG. 2A. Each wavelength ramp 1 to 2N addresses a dedicated beam propagation angle (i.e., a dedicated transmission direction). Each dedicated beam propagation angle will be addressed twice: once during ramp up (e.g., during a counterclockwise MEMS mirror motion) and again during ramp down (e.g., during a clockwise MEMS mirror motion). Thus, symmetrically opposed ramp pairs that are equidistant from the half-period mark (i.e., from the maximum deflection angle), such as first and final ramps, are assigned to the same angular sub-range but to different MEMS mirror motion directions.

All wavelengths in each wavelength ramp will propagate to the same direction due to dispersion compensation that is realized in the embodiments described herein. In order to address N angular positions (i.e., N dedicated transmission directions), it is necessary to have N up and N down ramps for a total 2N wavelength ramps.

Figure 3:
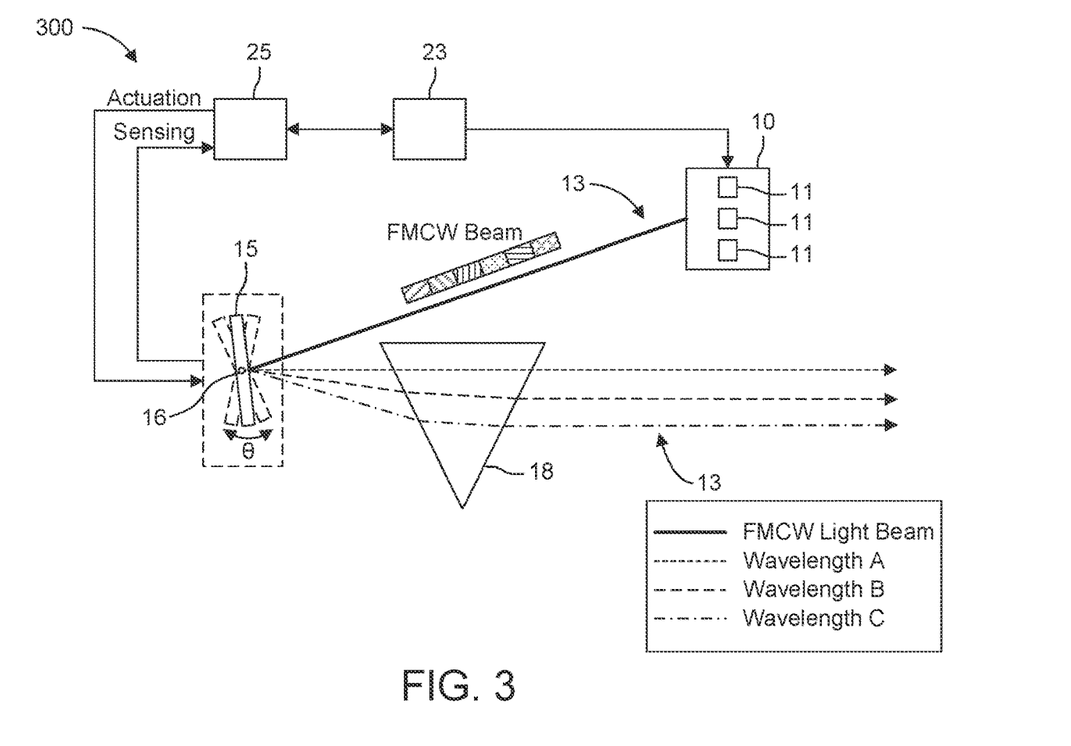
FIG. 3 shows a FMCW LIDAR system according to one or more embodiments.
Figure 4:
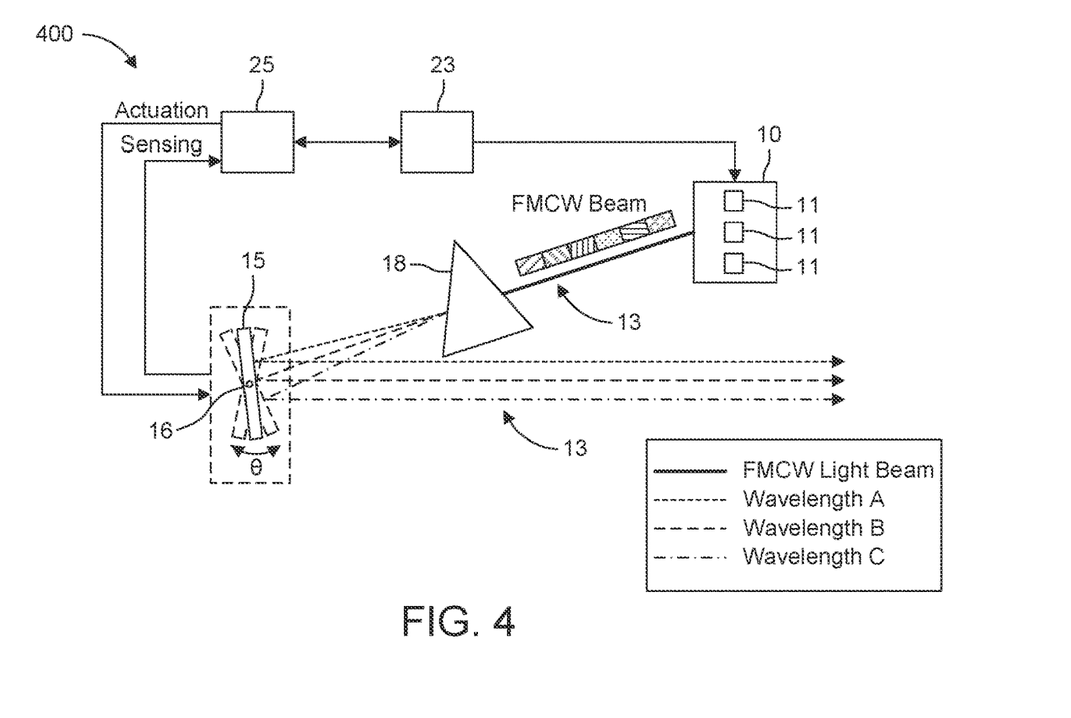
FIG. 4 shows another FMCW LIDAR system according to one or more embodiments.

FIG. 3 shows a FMCW LIDAR system 300 according to one or more embodiments. The FMCW LIDAR system 300 includes a transmitter 10 that includes a plurality of light sources 11 (e.g., laser diodes or light emitting diodes) that are configured to transmit a FMCW light beam along a transmission path 13 or channel. The light sources 11 may be linearly aligned in a single bar formation and are configured to transmit light used for scanning a field of view. The light emitted by the light sources is typically infrared light although light with another wavelength might also be used. The transmitter 10 may generate the FMCW light beam according to the wavelength ramping pattern shown in either FIG. 1 or FIG. 2A. As will be described below, the wavelength ramps may be synchronized with a corresponding angular range of a MEMS mirror motion with the aid of a controller 23 in accordance with the synchronization schemes described in conjunction with FIGS. 1, 2A, and 2B The shape of the light emitted by the light sources may be spread in a direction perpendicular to the transmission direction to form a light beam with an oblong shape perpendicular to a transmission direction. The illumination light transmitted from the light sources 11 is directed towards an oscillating MEMS mirror 15 and a transmitter optics 18 (i.e., a dispersive element). Thus, the FMCW LIDAR system 300 further includes a MEMS mirror 15 and a dispersive element 18 that are arranged along the transmission path 13. In this embodiment, the dispersive element 18 is arranged "downstream" from the MEMS mirror 15 along the transmission path 13. However, as shown in FIG. 4, the dispersive element 18 may be arranged "upstream" from the MEMS mirror 15 along the transmission path 13.

The MEMS mirror 15 is a mechanical moving mirror (i.e., a MEMS micro-mirror) integrated on a semiconductor chip (not shown). It is configured to oscillate about a scanning axis 16 such that its angle of rotation θ changes to perform a scanning operation. The MEMS mirror 15 itself is a resonator (i.e., a resonant MEMS mirror) configured to oscillate "side-to-side" about the scanning axis 16 at a resonance frequency such that the light reflected from the MEMS mirror 15 oscillates back and forth in a scanning direction. The reflected light may form a vertical scanning line of light that oscillates back and forth in a horizontal scanning direction or it may form a horizontal scanning line of light that oscillates back and forth in a vertical scanning direction. A scanning period or an oscillation period is defined, for example, by one complete oscillation from a first edge of the field of view (e.g., left side) to a second edge of the field of view (e.g., right side) and then back again to the first edge. A mirror period of the MEMS mirror 15 corresponds to a scanning period.

Thus, the field of view is scanned in the scanning direction by a bar of light by changing the deflection angle θ of the MEMS mirror 15 on its scanning axis 16. For example, the MEMS mirror 15 may be configured to oscillate at a resonance frequency of 2 kHz, between +/−15 degrees to steer the light over +/−30 degrees making up the scanning range of the field of view. Thus, the field of view may be scanned, line-by-line, by a rotation of the MEMS mirror 15 through its degree of motion. One such sequence through the degree of motion (e.g., from −15 degrees to +15 degrees) is referred to as a single scan or scanning cycle. Multiple scans may be used to generate distance and depth maps, as well as 3D images by a processing unit.

While the transmission mirror is described in the context of a MEMS mirror, it will be appreciated that other mirrors can also be used. In addition, the resonance frequency or the degree of rotation is not limited to 2 kHz and +/−15 degrees, respectively, and both the resonance frequency and the field of view may be increased or decreased according to the application.

The dispersive element 18 may be a prism, a diffractive grating, or other dispersive structure that is capable of compensating the propagation direction disturbance caused by the MEMS mirror 15 via dispersion. As a result of the dispersive element 18 being arranged in the transmission path 13 downstream from the MEMS mirror 15, the FMCW light beam that is directed (by reflection) by the MEMS mirror 15 is compensated such that all wavelengths of a particular wavelength ramp of the FMCW light beam are directed at a same point on a target, thereby enabling FMCW ToF measurements. In this example, three wavelengths A, B, and C of a particular wavelength ramp (e.g., selected from wavelength ramps 1 to 2N) that are diverging from a point on a target due the oscillation of the MEMS mirror 15 are shown being aligned by the dispersive element 18 with the point on the target (i.e., being aligned with a same transmission direction). Thus, each wavelength of a particular wavelength ramp of the FMCW light beam is aligned in a same direction at an output of the transmission path 13.

The FMCW LIDAR system 300 further includes a system controller 23 and a MEMS driver 25. The system controller 23 is configured to control components of the FMCW LIDAR system 300. Thus, the system controller 23 includes control circuitry, such as a microcontroller, that is configured to generate control signals. In this example, the control signals may be used to control a function of the transmitter 10 (i.e., a function of the light sources 11) and the MEMS driver 25. For example, the system controller 23 may control the oscillation frequency and the oscillation range (angular range of motion) of the MEMS mirror 15. Additionally, the system controller 23 may control the length L of the wavelength ramps of the FMCW light beam in order to synchronize the length L with the angular range or sub-range of motion of the MEMS mirror 15, as described above in conjunction with FIGS. 1, 2A, and 2B. As such, each wavelength of the FMCW light beam is mapped by the system controller 23 to one or more specific deflection angles and the continuous change of the wavelength is synchronized with a continuous change of the deflection angle.

The MEMS driver 25 is configured to drive the MEMS mirror 15. In particular, the MEMS driver 25 actuates and senses the rotation position of the mirror, and provides position information (e.g., tilt angle or degree of rotation about the rotation axis) of the mirror to the system controller 23. Thus, the MEMS driver 25 includes a measurement circuit configured to measure the rotation position of the mirror.

For example, an actuator structure that is used to drive the MEMS mirror 15 may be a comb-drive rotor and stator that include two drive capacitors whose capacitance or stored charge is deflection angle dependent. Thus, the measurement circuit may determine the rotation position by measuring the capacitances of the drive capacitors or their stored charges.

Based on this position information, the system controller 23 may adjust the length L of the wavelength ramp to ensure synchronization between the wavelength of the FMCW light beam and the deflection angle of the MEMS mirror 15 is maintained.

FIG. 4 shows a FMCW LIDAR system 400 according to one or more embodiments. The FMCW LIDAR system 400 is similar to FMCW LIDAR system 300 with the exception that the dispersive element 18 is arranged upstream from the MEMS mirror 15 along the transmission path 13. In this case, the dispersive element 18 introduces a pre-distortion to the FMCW light beam in anticipation of the propagation direction disturbance caused by the oscillation of the MEMS mirror 15. In other words, the dispersive element 18 provides pre-compensation such that different wavelengths of the FMCW light beam are dispersed or spread by the dispersive element 18 in different directions along the transmission path 13 towards the MEMS mirror 15. This may also be referred to as a beam compensative tilt. Upon being incident on the MEMS mirror 15, each wavelength of a particular wavelength ramp is aligned with the same point on a target despite each wavelength of the wavelength ramp being deflected at a different deflection angle θ of the MEMS mirror 15. Thus, each wavelength of a particular wavelength ramp of the FMCW light beam is transmitted in the same transmission direction/angle by the system 400.

The FMCW LIDAR system 400 further includes a system controller 23 and a MEMS driver 25 as similarly described above for performing synchronization between the wavelength of the FMCW light beam and the deflection angle of the MEMS mirror 15.

Figure 5:
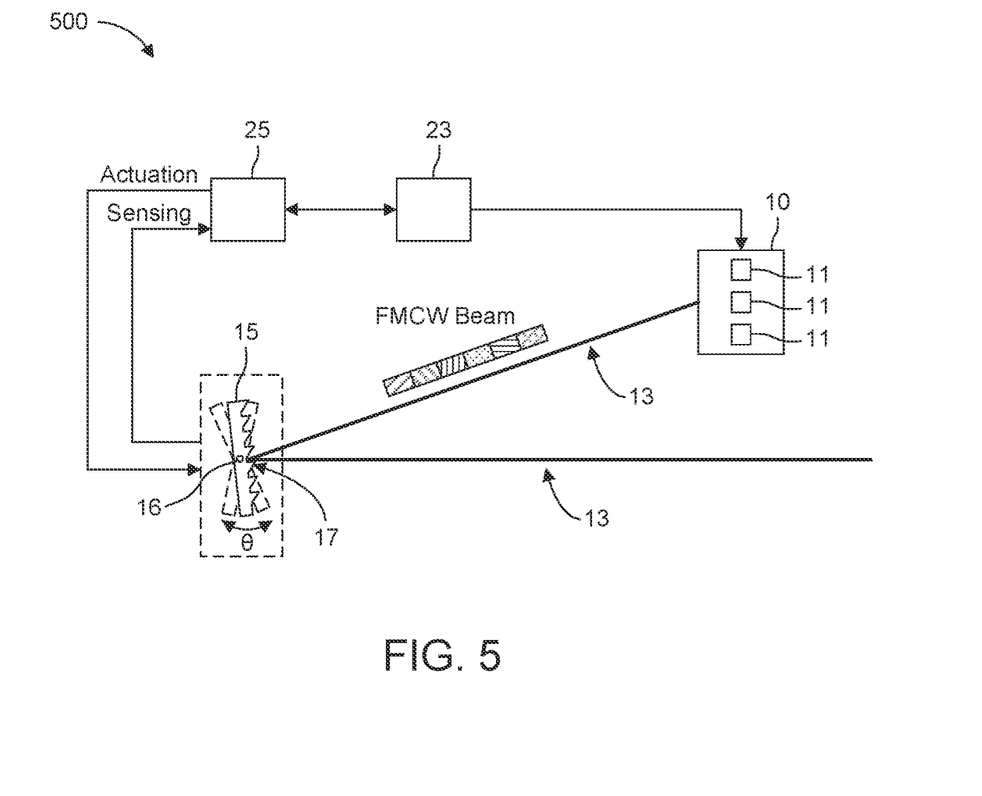
FIG. 5 shows another FMCW LIDAR system according to one or more embodiments.

FIG. 5 shows a FMCW LIDAR system 500 according to one or more embodiments. In this example, the MEMS mirror 15 has a micro-structured MEMS surface 17, such as a diffractive grating. As a result, the FMCW light beam propagation compensation is introduced at the reflective surface of the MEMS mirror as the FMCW light beam is reflected by the micro-structured MEMS surface 17. Thus, each wavelength of a particular wavelength ramp of the FMCW light beam is transmitted in the same transmission direction/angle by the system 500.

The FMCW LIDAR system 500 further includes a system controller 23 and a MEMS driver 25 as similarly described above for performing synchronization between the wavelength of the FMCW light beam and the deflection angle of the MEMS mirror 15.

Additional embodiments are provided below:

Embodiment 1 includes an oscillator system, comprising: a transmitter configured to transmit a frequency modulated continuous wave (FMCW) light beam along a transmission path, wherein the FMCW light beam comprises a plurality of wavelength ramps and a wavelength of the FMCW light beam continuously varies over time; and an oscillator structure configured to oscillate about a scanning axis based on a deflection angle of the oscillator structure that continuously varies over time, wherein the oscillator structure is arranged in the transmission path and is configured to receive the FMCW light beam at a reflective surface, and wherein the reflective surface is a micro-structured surface configured to compensate for a propagation direction disturbance caused by an oscillation of the oscillator structure such that each wavelength of a corresponding wavelength ramp of the FMCW light beam is reflected by the reflective surface in a same direction along transmission path.

Embodiment 2 includes the oscillator system of embodiment 1, wherein the micro-structured surface is a diffractive grating.

Embodiment 3 includes the oscillator system of embodiment 1, further comprising: a controller configured to synchronize the wavelength of the FMCW light beam with the deflection angle of the oscillator structure.

Embodiment 4 includes the oscillator system of embodiment 3, wherein the controller is configured to synchronize the wavelength of the FMCW light beam with the deflection angle of the oscillator structure such that the wavelength of the FMCW light beam varies in synchronization with a variance in the deflection angle of the oscillator structure.

Embodiment 5 includes the oscillator system of embodiment 3, wherein the controller is configured to synchronize the wavelength of the FMCW light beam with the deflection angle of the oscillator structure such that each wavelength of the FMCW light beam is mapped to a different deflection angle of a plurality of deflection angles as the deflection angle varies over time.

Embodiment 6 includes the oscillator system of embodiment 3, wherein the controller is configured to synchronize the wavelength of the FMCW light beam with the deflection angle of the oscillator structure such that the length of the forward ramps and the backward ramps is synchronized with an angular range of the deflection angle of the oscillator structure.

Embodiment 7 includes the oscillator system of embodiment 6, wherein the controller is configured to control the length of the forward ramps and the backward ramps in order to synchronize the length with the angular range of the deflection angle of the oscillator structure.

Embodiment 8 includes the oscillator system of embodiment 6, wherein: the minimum wavelength of the FMCW light beam is synchronized with a zero deflection angle of the oscillator structure and the maximum wavelength of the FMCW light beam is synchronized with a maximum deflection angle of the oscillator structure, or the minimum wavelength of the FMCW light beam is synchronized with the maximum deflection angle of the oscillator structure and the maximum wavelength of the FMCW light beam is synchronized with the zero deflection angle of the oscillator structure.

Embodiment 9 includes the oscillator system of embodiment 1, wherein the controller is configured to synchronize a continuous variance of the wavelength of the FMCW light beam with a continuous variance of the deflection angle of the oscillator structure.

Embodiment 10 includes the oscillator system of embodiment 1, further comprising: a measurement circuit configured to measure the deflection angle of the oscillator structure as the deflection angle varies over time and generate position information based on the measured deflection angle, wherein the controller is configured to synchronize the wavelength of the FMCW light beam with the deflection angle of the oscillator structure based on the position information.

Embodiment 11 includes the oscillator system of embodiment 1, wherein the plurality of wavelength ramps correspond to an oscillation period of the oscillator structure, the plurality of wavelength ramps including a series of consecutive forward ramps generated over a first half-period of the oscillation period and a series of consecutive backward ramps generated over a second half-period of the oscillation period.

Embodiment 12 includes the oscillator system of embodiment 11, wherein the series of consecutive forward ramps includes N forward ramps and the series of consecutive backward ramps includes N backward ramps, wherein N is an integer greater than zero.

Embodiment 13 includes the oscillator system of embodiment 11, wherein the transmitter is configured to change a ramping direction of the plurality of wavelength ramps at a maximum deflection angle of the oscillator structure.

Embodiment 14 includes the oscillator system of embodiment 11, wherein each wavelength ramp of the plurality of wavelength ramps corresponds to one angular sub-range of a plurality of angular sub-ranges that make up a full angular range of the deflection angle of the oscillator structure.

Embodiment 15 includes the oscillator system of embodiment 14, wherein: each wavelength ramp of the series of consecutive forward ramps corresponds to a different angular sub-range of the full angular range of the deflection angle, and each wavelength ramp of the series of consecutive backward ramps corresponds to a different angular sub-range of the full angular range of the deflection angle.

Embodiment 16 includes the oscillator system of embodiment 14, wherein: each of the plurality of wavelength ramps have a length corresponding to a time duration each of the plurality of ramps takes to transition between a minimum wavelength and a maximum wavelength, and the oscillator system further comprises: a controller configured to control the length of each of the plurality of wavelength ramps in order to synchronize the length with an angular sub-range of the full angular range of the deflection angle.

Embodiment 17 includes the oscillator system of embodiment 14, further comprising: a controller configured to synchronize each of the plurality of wavelength ramps to a corresponding angular sub-range of the plurality of angular sub-ranges.

Embodiment 18 includes the oscillator system of embodiment 17, wherein the controller is configured to synchronize the wavelength of the FMCW light beam with the deflection angle of the oscillator structure such that the wavelength of each wavelength ramp varies in synchronization with a variance in the deflection angle over the corresponding angular sub-range.

Embodiment 19 includes the oscillator system of embodiment 11, wherein each wavelength ramp of the plurality of wavelength ramps corresponds to one dedicated beam propagation direction of a plurality of dedicated beam propagation directions, and the micro-structured surface is configured to compensate the FMCW light beam such that each wavelength of a same wavelength ramp is aligned in a same dedicated beam propagation direction at the output of the transmission path.

Embodiment 20 includes the oscillator system of embodiment 19, wherein: each wavelength ramp of the series of consecutive forward ramps corresponds to a different dedicated beam propagation direction of the plurality of dedicated beam propagation directions, and each wavelength ramp of the series of consecutive backward ramps corresponds to a different dedicated beam propagation direction of the plurality of dedicated beam propagation directions.

Although embodiments described herein relate to a MEMS device with a mirror, it is to be understood that other implementations may include optical devices other than MEMS mirror devices, including those not related to LIDAR. In addition, although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, some one or more of the method steps may be executed by such an apparatus.

While various embodiments have been described, it will be apparent to those of ordinary skill in the art that many more embodiments and implementations are possible within the scope of the disclosure. Accordingly, the invention is not to be restricted except in light of the attached claims and their equivalents. With regard to the various functions performed by the components or structures described above (assemblies, devices, circuits, systems, etc.), the terms (including a reference to a "means") used to describe such components are intended to correspond, unless otherwise indicated, to any component or structure that performs the specified function of the described component (i.e., that is functionally equivalent), even if not structurally equivalent to the disclosed structure that performs the function in the exemplary implementations of the invention illustrated herein.

Furthermore, the following claims are hereby incorporated into the detailed description, where each claim may stand on its own as a separate example embodiment. While each claim may stand on its own as a separate example embodiment, it is to be noted that—although a dependent claim may refer in the claims to a specific combination with one or more other claims—other example embodiments may also include a combination of the dependent claim with the subject matter of each other dependent or independent claim. Such combinations are proposed herein unless it is stated that a specific combination is not intended. Furthermore, it is intended to include also features of a claim to any other independent claim even if this claim is not directly made dependent to the independent claim.

It is further to be noted that methods disclosed in the specification or in the claims may be implemented by a device having means for performing each of the respective acts of these methods.

Further, it is to be understood that the disclosure of multiple acts or functions disclosed in the specification or in the claims may not be construed as to be within the specific order. Therefore, the disclosure of multiple acts or functions will not limit these to a particular order unless such acts or functions are not interchangeable for technical reasons. Furthermore, in some embodiments a single act may include or may be broken into multiple sub acts. Such sub acts may be included and part of the disclosure of this single act unless explicitly excluded.

Instructions may be executed by one or more processors, such as one or more central processing units (CPU), digital signal processors (DSPs), general purpose microprocessors, application specific integrated circuits (ASICs), field programmable logic arrays (FPGAs), or other equivalent integrated or discrete logic circuitry. Accordingly, the term "processor" or "processing circuitry" as used herein refers to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

Thus, the techniques described in this disclosure may be implemented, at least in part, in hardware, software, firmware, or any combination thereof. For example, various aspects of the described techniques may be implemented within one or more processors, including one or more microprocessors, DSPs, ASICs, or any other equivalent integrated or discrete logic circuitry, as well as any combinations of such components.

A controller including hardware may also perform one or more of the techniques described in this disclosure. Such hardware, software, and firmware may be implemented within the same device or within separate devices to support the various techniques described in this disclosure. Software may be stored on a non-transitory computer-readable medium such that the non-transitory computer readable medium includes a program code or a program algorithm stored thereon which, when executed, causes the controller, via a computer program, to perform the steps of a method.

Although various exemplary embodiments have been disclosed, it will be apparent to those skilled in the art that various changes and modifications can be made which will achieve some of the advantages of the concepts disclosed herein without departing from the spirit and scope of the invention. It will be obvious to those reasonably skilled in the art that other components performing the same functions may be suitably substituted. It is to be understood that other embodiments may be utilized and structural or logical changes may be made without departing from the scope of the present invention. It should be mentioned that features explained with reference to a specific figure may be combined with features of other figures, even in those not explicitly mentioned. Such modifications to the general inventive concept are intended to be covered by the appended claims and their legal equivalents.

What is claimed is:

1. An oscillator system, comprising:
a transmitter configured to transmit a frequency modulated continuous wave (FMCW) light beam along a transmission path, wherein the FMCW light beam comprises a plurality of wavelength ramps and a wavelength of the FMCW light beam continuously varies over time; and
an oscillator structure configured to oscillate about a scanning axis based on a deflection angle of the oscillator structure that continuously varies over time,
wherein the oscillator structure is arranged in the transmission path and is configured to receive the FMCW light beam at a reflective surface, and
wherein the reflective surface is a micro-structured surface configured to compensate for a propagation direction disturbance caused by an oscillation of the oscillator structure such that each wavelength of a corresponding wavelength ramp of the FMCW light beam is reflected by the reflective surface in a same direction along the transmission path.

2. The oscillator system of claim 1, wherein the micro-structured surface is a diffractive grating.

3. The oscillator system of claim 1, further comprising:
a controller configured to synchronize the wavelength of the FMCW light beam with the deflection angle of the oscillator structure.

4. The oscillator system of claim 3, wherein the controller is configured to synchronize the wavelength of the FMCW light beam with the deflection angle of the oscillator structure such that the wavelength of the FMCW light beam varies in synchronization with a variance in the deflection angle of the oscillator structure.

5. The oscillator system of claim 3, wherein the controller is configured to synchronize the wavelength of the FMCW light beam with the deflection angle of the oscillator structure such that each wavelength of the FMCW light beam is mapped to a different deflection angle of a plurality of deflection angles as the deflection angle varies over time.

6. The oscillator system of claim 3, wherein the plurality of wavelength ramps include alternating forward ramps and backward ramps, and
wherein the controller is configured to synchronize the wavelength of the FMCW light beam with the deflection angle of the oscillator structure such that a length of forward ramps and backward ramps is synchronized with an angular range of the deflection angle of the oscillator structure.

7. The oscillator system of claim 6, wherein the controller is configured to control the length of the forward ramps and the backward ramps in order to synchronize the length of the forward ramps with the angular range of the deflection angle of the oscillator structure.

8. The oscillator system of claim 6, wherein:
a minimum wavelength of the FMCW light beam is synchronized with a zero deflection angle of the oscillator structure and a maximum wavelength of the FMCW light beam is synchronized with a maximum deflection angle of the oscillator structure, or
the minimum wavelength of the FMCW light beam is synchronized with the maximum deflection angle of the oscillator structure and the maximum wavelength of the FMCW light beam is synchronized with the zero deflection angle of the oscillator structure.

9. The oscillator system of claim 1, further comprising:
a controller configured to synchronize a continuous variance of the wavelength of the FMCW light beam with a continuous variance of the deflection angle of the oscillator structure.

10. The oscillator system of claim 1, further comprising:
a measurement circuit configured to measure the deflection angle of the oscillator structure as the deflection angle varies over time and generate position information based on the measured deflection angle; and
a controller configured to synchronize the wavelength of the FMCW light beam with the deflection angle of the oscillator structure based on the position information.

11. The oscillator system of claim 1, wherein the plurality of wavelength ramps correspond to an oscillation period of the oscillator structure, the plurality of wavelength ramps including a series of consecutive forward ramps generated over a first half-period of the oscillation period and a series of consecutive backward ramps generated over a second half-period of the oscillation period.

12. The oscillator system of claim 11, wherein the series of consecutive forward ramps includes N forward ramps and the series of consecutive backward ramps includes N backward ramps, wherein N is an integer greater than zero.

13. The oscillator system of claim 11, wherein the transmitter is configured to change a ramping direction of the plurality of wavelength ramps at a maximum deflection angle of the oscillator structure.

14. The oscillator system of claim 11, wherein each wavelength ramp of the plurality of wavelength ramps corresponds to one angular sub-range of a plurality of angular sub-ranges that make up a full angular range of the deflection angle of the oscillator structure.

15. The oscillator system of claim 14, wherein:
each wavelength ramp of the series of consecutive forward ramps corresponds to a different angular sub-range of the full angular range of the deflection angle, and
each wavelength ramp of the series of consecutive backward ramps corresponds to a different angular sub-range of the full angular range of the deflection angle.

16. The oscillator system of claim 14, wherein:
each of the plurality of wavelength ramps have a length corresponding to a time duration each of the plurality of wavelength ramps takes to transition between a minimum wavelength and a maximum wavelength, and
the oscillator system further comprises:
a controller configured to control a length of each of the plurality of wavelength ramps in order to synchronize the length of each of the plurality of wavelength ramps with an angular sub-range of the full angular range of the deflection angle.

17. The oscillator system of claim 14, further comprising:
a controller configured to synchronize each of the plurality of wavelength ramps to a corresponding angular sub-range of the plurality of angular sub-ranges.

18. The oscillator system of claim 17, wherein the controller is configured to synchronize the wavelength of the FMCW light beam with the deflection angle of the oscillator structure such that the wavelength of each wavelength ramp varies in synchronization with a variance in the deflection angle over the corresponding angular sub-range.

19. The oscillator system of claim 11, wherein:
each wavelength ramp of the plurality of wavelength ramps corresponds to one dedicated beam propagation direction of a plurality of dedicated beam propagation directions, and
the micro-structured surface is configured to compensate the FMCW light beam such that each wavelength of a same wavelength ramp is aligned in a same dedicated beam propagation direction at an output of the transmission path.

20. The oscillator system of claim 19, wherein:
each wavelength ramp of the series of consecutive forward ramps corresponds to a different dedicated beam propagation direction of the plurality of dedicated beam propagation directions, and
each wavelength ramp of the series of consecutive backward ramps corresponds to a different dedicated beam propagation direction of the plurality of dedicated beam propagation directions.

21. The oscillator system of claim 1, wherein the reflective surface is arranged on the oscillator structure and is configured to oscillate about the scanning axis based on the deflection angle of the oscillator structure.

* * * * *